Dec. 30, 1969 G. W. GOODRICH ET AL 3,486,868

METHOD FOR PRODUCING MINIATURIZED PERFORATED PATTERNS

Filed Feb. 24, 1969

INVENTOR.

GEORGE W. GOODRICH

PAUL T. HIGGINS

United States Patent Office 3,486,868
Patented Dec. 30, 1969

3,486,868
METHOD FOR PRODUCING MINIATURIZED PERFORATED PATTERNS

George W. Goodrich, 5123 N. Kellen Court, Bloomfield Hills, Mich. 48013, and Paul T. Higgins, 11 Concord, Sidney, N.Y. 13838

Continuation-in-part of application Ser. No. 526,617, Feb. 2, 1966. This application Feb. 24, 1969, Ser. No. 813,373
Int. Cl. B01d 37/02
U.S. Cl. 65—23 5 Claims

ABSTRACT OF THE DISCLOSURE

The method of producing miniaturized perforated patterns of irregular or non-uniform configuration comprises the steps of forming a core of material which is soluble in a given solvent, and having the desired configuration, packing a second, insoluble material about the core, heating and drawing the combined materials to a length calculated to provide the desired perforation size and dissolving the core. If wafer-like patterns are desired, as for instance, for forming fluidic circuit elements, the wafers may be cut prior to the removal of the core material.

This application is a continuation-in-part of application Ser. No. 526,617, filed Feb. 2, 1966, now abandoned.

Summary of the Invention

This invention pertains to methods for obtaining miniaturized perforated patterns in a wafer or other material which are particularly useful for forming fluid state circuits in thermoplastic materials. In a fluid state circuit, for example, it is desired to form very small intricate patterns by perforating wafers or disks in the shape of such patterns.

Existing techniques for producing miniaturized perforated patterns, such as a fluid state amplifier circuit, including etching a photosensitive glass or plastic; etching a masked metal lamination; plastic casting; electron beam machining; electrical discharge machining; and stamping and milling. Generally, the above processes which depend on etching are limited by an inability to produce straight walls in the perforation since an etching process characteristically provides angular walls. Further, it is difficult by any of the prior methods to reproduce identical circuits. Likewise, it is difficult in the above processes to achieve quality control because checking the configuration of the miniaturized circuits is a strenuous task which is made more difficult when many miniaturized circuits are integrated into a network circuit. The machining methods listed above require skilled personnel operating relatively expensive machinery and hence are quite costly.

This invention overcomes the above difficulties by the method having the following steps: selecting suitable, preferably thermoplastic materials, forming a soluble core material which has a cross section corresponding to the perforation pattern desired; packing insoluble material about the core material; heating the soluble and insoluble materials and drawing them to a desired length which will proportionately reduce the cross section and provide a miniaturized pattern; slicing wafers from the drawn material; and dissolving the soluble core from the insoluble material around it to provide a miniaturized circuit which has straight side walls and a multitude of identical circuits. Also, the pattern can be checked for accuracy before drawing when it is in a relatively large cross-section and hence more easily checked.

Thermoplastic, as used herein, is used in the dictionary sense, that is, to denote materials which exhibit a plastic phase or state upon the application of heat.

The prior art shows that it is known that regular (i.e., circular hexagonal, and the like) perforations may be formed in thermoplastic material by imbedding a sacrificial material in the thermoplastic material and then removing the sacrificial material by chemical etching. The use of an etchant requires great care in handling and the etchants used are known to attack the thermoplastic material, though to a lesser degree. It is, therefore, an object of the present invention to provide a means of forming a patterned perforation which relies on means other than etching to remove a sacrificial core material. The fact that the etchant will frequently attack the remaining material is of slight consequence when the desired perforation is of regular shape since the remaining material will be proportionately removed. However, with an irregular perforation such as the fluid flow passage of a fluidic element, the fact that an etchant will attack the thermoplastic material becomes critical since irregular perforations often depend upon the relative sizes of the various portions of the perforation as well as the general configuration. It is, therefore, a still further object of this invention to provide a method of forming irregular perforations in a thermoplastic material by destruction of a core material in such a manner that the remaining perforated material is not damaged.

In the formation of miniaturized perforated patterns, it is highly advantageous if the materials can be operated on on a larger scale where the configuration of the perforation can be readily verified for accuracy and then be reduced in size to provide the desired ultimate perforation size. The prior art teaches that a size reduction may be obtained in thermoplastic materials having a sacrificial core provided that a means is provided of uniformly exposing the sacrificial material to the etchant which is used to destroy the core material. In the case of regular perforations, the axially extending bore which provides for substantially uniform etching of the core does not affect the change in the perforation. However, where the perforation is irregular, the existence of the axially-extending passage or bore causes a pressure imbalance which is capable of deforming an irregularly shaped core and thermoplastic material. It is, therefore, an object of the present invention to provide a method of producing miniaturized perforated patterns in which a substantially solid sacrificial core material having the desired cross-section is combined with a thermoplastic material in which the perforation is desired and which combination can be reduced in size and without altering the proportions of the core configuration. It is a still further object of the present invention to provide such a method which provides for removal of the core material without the possibility of damage to the thermoplastic material.

These and other advantages of this invention will become apparent when preferred embodiments are considered with the drawings in which.

Detailed description

Figures 1, 2, 3:
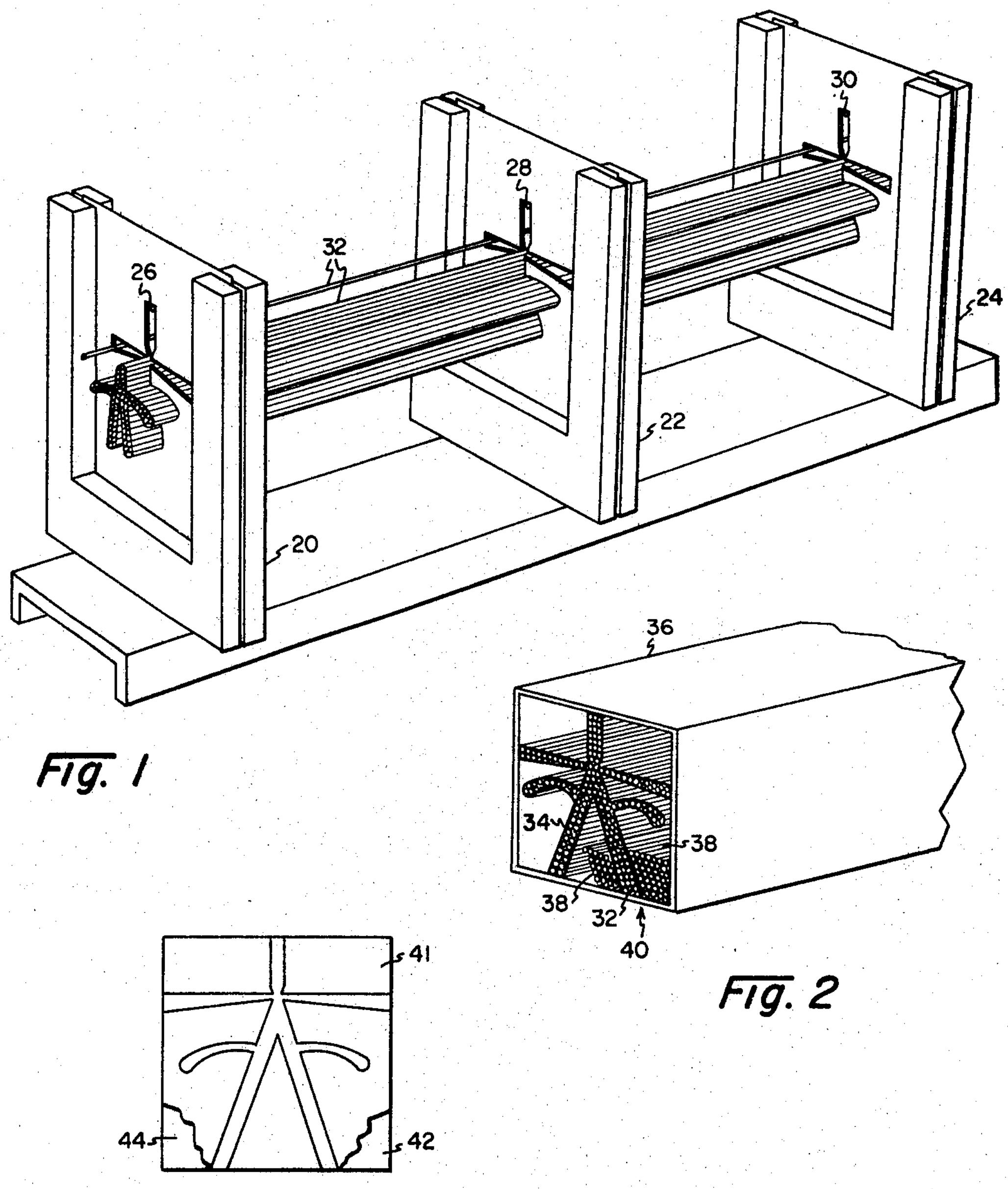
FIGURE 1 shows a perspective view of a plurality of templates for holding a large number of glass rods which will form the core material.
FIGURE 2 shows in a partial, perspective view the core of FIGURE 1 placed in a square form after which a plurality of insoluble glass rods are packed in the open spaces.
FIGURE 3 is an enlarged cross section of a wafer cut from the octagonal rod which is produced by heating and drawing the configuration of FIGURE 2.

In FIGURE 1 is shown templates 20, 22 and 24 which have identical patterns 26, 28, 30 formed therein. The patterns shown in the templates 20, 22, and 24 are irregular patterns representative of one type of fluidic element and are considered to be representative of the irregular core patterns for which my method is suitable. A multitude of very small diameter, in the order of 0.015 inch, glass rods 32 are inserted through the aligned patterns 26, 28, and 30. The glass rods may have the compositions of 40–50 percent by weight of $B_2O_3$, 17–20 percent by weight of $Na_2O$ and 34–40 percent by weight of $SiO_2$. This type of glass is water soluble. In FIGURE 1, the top portion of the patterns 26, 28 and 30 have not had the glass rods placed therein.

After the patterns 26, 28, and 30 have been completely filled with glass rods, a glue such as nitrocellulose is then applied to the ends of glass rods 32 and the templates 20, 22 and 24 are removed leaving a core 34. The core 34 thus formed is then placed in a square form 36, FIGURE 2, and additional glass rods 38 are placed in the openings between the core 34 and the form 36. The additional glass rods may be made from an ordinary glass which is not water soluble. Only a portion of the rods 38 are shown inserted in the form 36.

Again, after form 36 is completely filled, the ends of the individual glass tubes 38 may be cemented and the form 36 removed leaving a composite body or billet 40. The square billet 40, which may be 1.25 inches across the diagonal, may then be fed into a furnace which is held at 1100° F. and drawn with a draw rate 100 times faster than the feed rate so that the glass is reduced to .125 inch across the diagonal. The reduction occurs without any distortion of the pattern formed by core 34 because the combined materials form a unitary mass having a substantially solid configuration. Since the heating of the billet 40 occurs prior to the drawing and subsequent size reduction, the glass rods or tubes 32 and 38 have sufficient time to fill the small interstitial regions formed between adjacent rods or tubes 32 and 38. While we have illustrated our invention with respect to rods and tubes, it will be apparent that the materials used may be used in any convenient form.

The drawn billet 40 may then be sliced to form wafers 41 as indicated in FIGURE 3. The wafers may then be secured to a base layer 42. Each wafer and base layer 42 may be placed in a container, and the soluble glass 34 may be dissolved by boiling the wafer in deionized water. A top cover 44 may then be secured to the top of the wafer and base layer 42. Thus, a miniaturized pattern is formed in a thermoplastic material which in this case is glass and additional identical patterns may be provided by simply slicing additional wafers from the drawn billet 40. Also, the pattern cross section can be checked for accuracy before drawing when it is relatively larger and irregularities are more easily checked.

Although this invention has been disclosed and illustrated with reference to particular applications, the principles involved are susceptible to numerous other applications which will be apparent to persons skilled in the art. For example, the core 34 may be formed in other ways, such as by grinding to the desired configuration. The materials used may be any combination or pair of materials which respond substantially identically in the presence of heat, that is, are similarly thermoplastic, one of which is soluble in a given solvent and the other of which is insoluble in the same solvent. Examples of such materials are:

| Solvent | Insoluble thermoplastic | Soluble thermoplastic |
|---|---|---|
| Methyl methacrylate | Acetal coploymer | Acrylic resin. |
| Water | Kimble KG–12 glass | $B_2O_3$ weight percent 45<br>$Na_2O$ weight percent 19.0.<br>$SiO_2$ weight percent 36.0. |
| Acetone | Polyethylene | Cellulose nitrate. |

This invention is, therefore, to be limited only as indicated by the scope of the appended claims.

We claim:

1. A method for forming fluidic element configurations in a material comprising the steps of:

selecting a pair of thermoplastic materials which become plastic in a known temperature range, one of which having a high solubility in a given non acidic solvent, the other of which having a substantially lower solubility in the given solvent;

forming the high solubility material into a core of predetermined configuration and having an irregular cross-section;

forming the lower solubility material about said core to form a composite body;

heating and drawing said composite body to a predetermined length thereby proportionately reducing the cross-sectional area of said composite body without distortion of the predetermined configuration while fusing the lower solubility material to form a unitary mass with the high solubility material; and applying the given solvent so as to dissolve the high solubility material without affecting the lower solubility material.

2. The method as claimed in claim 1 including the step of:

slicing said drawn unitary mass into substantially identical wafers each having the desired configuration prior to the step of dissolving the higher solubility core material.

3. The method as claimed in claim 2 including the step of:

mounting said wafers on a base layer.

4. The method as claimed in claim 1 wherein said core is formed by supporting a plurality of high solubility elements in template means to form the desired configuration.

5. The method as claimed in claim 1 wherein said core is formed grinding a unit of said high solubility material to the desired configuration.

References Cited

UNITED STATES PATENTS

| | | | |
|---|---|---|---|
| 2,752,731 | 7/1956 | Altosaar | 65—23 |
| 3,275,428 | 9/1966 | Siegmund | 65—4 |
| 3,291,870 | 12/1966 | Allison | 264—.5 |
| 3,294,504 | 12/1966 | Hicks | 65—3 |

LEON BASHORE, Primary Examiner

J. H. HARMAN, Assistant Examiner

U.S. Cl. X.R.

65—4; 156—155; 264—317